United States Patent
Messner

[11] Patent Number: 5,845,666
[45] Date of Patent: Dec. 8, 1998

[54] CANOPY WITH LATCH AND PIVOT MEMBERS

[75] Inventor: Mark Matthew Messner, Reading, Pa.

[73] Assignee: Graco Children's Products Inc., Elverson, Pa.

[21] Appl. No.: 738,238

[22] Filed: Oct. 25, 1996

[51] Int. Cl.$^6$ .................................................. E04H 15/44
[52] U.S. Cl. ........................... 35/133; 135/147; 135/151; 5/656; 403/97; 16/334; 16/344
[58] Field of Search ............... 135/16, 20.1, 66, 135/88.01, 90, 96, 133, 135, 147, 148, 151, 152, 155, 117; 297/184.15, 184.17; 16/344, 334, 335; 403/93, 96, 97; 5/656, 639, 419

[56] References Cited

U.S. PATENT DOCUMENTS

| | | |
|---|---|---|
| 3,277,601 | 10/1966 | Ryan . |
| 3,533,648 | 10/1970 | Thieberger . |
| 4,087,885 | 5/1978 | Gillentine ........................... 16/334 X |
| 4,211,451 | 7/1980 | Shephard ........................... 16/344 X |
| 4,343,322 | 8/1982 | Fiddler ............................ 135/133 X |
| 4,809,724 | 3/1989 | Fuser . |
| 4,978,166 | 12/1990 | James ................................ 297/184.17 |
| 5,039,118 | 8/1991 | Huang . |
| 5,056,805 | 10/1991 | Wang . |
| 5,062,179 | 11/1991 | Huang . |
| 5,168,601 | 12/1992 | Liu . |
| 5,184,835 | 2/1993 | Huang . |
| 5,184,865 | 2/1993 | Mohtasham et al. ............... 135/133 X |
| 5,190,390 | 3/1993 | Ming-Tai . |
| 5,244,228 | 9/1993 | Chiu . |
| 5,257,799 | 11/1993 | Cone et al. . |
| 5,320,405 | 6/1994 | Foster et al. ........................ 135/90 X |
| 5,334,354 | 8/1994 | Johnston et al. ..................... 403/93 X |
| 5,511,259 | 4/1996 | Tarara ............................... 135/133 X |
| 5,551,745 | 9/1996 | Huang .............................. 135/133 X |
| 5,620,272 | 4/1997 | Sheng ................................. 403/96 |

FOREIGN PATENT DOCUMENTS 291517  1/1990  Germany .

*Primary Examiner*—Lanna Mai
*Attorney, Agent, or Firm*—Richard B. O'Planick

[57] ABSTRACT

A canopy for providing shade and protection from the elements to persons is disclosed. The canopy includes a silent pivoting mechanism and a quick-release feature.

26 Claims, 4 Drawing Sheets

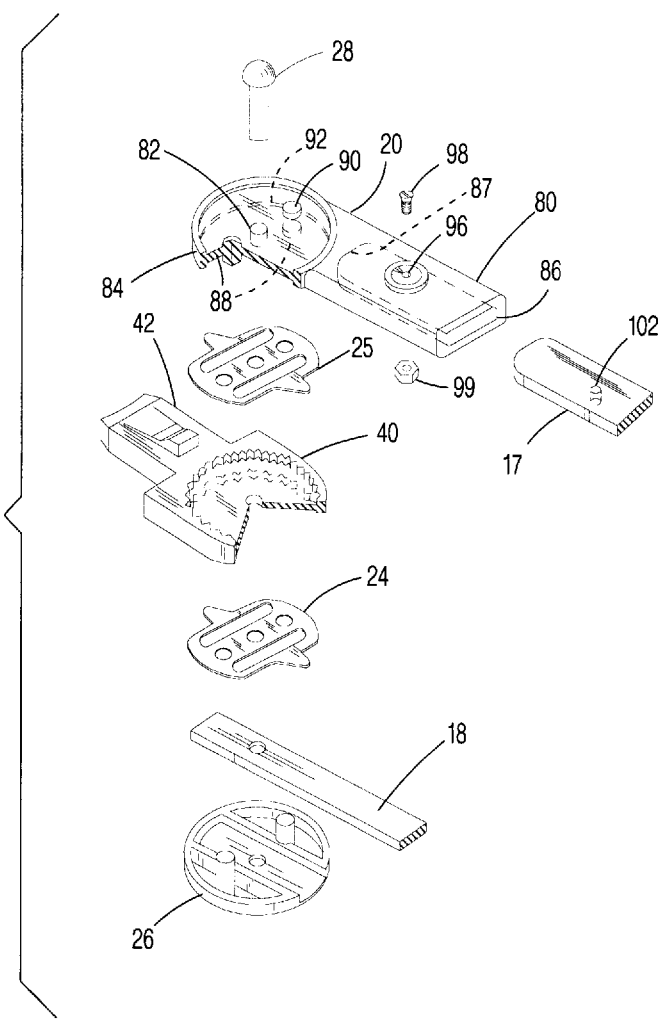

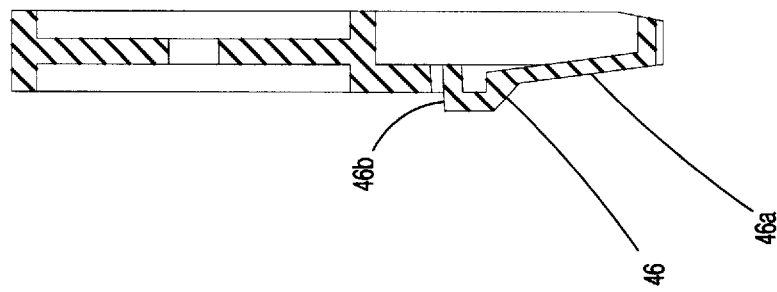
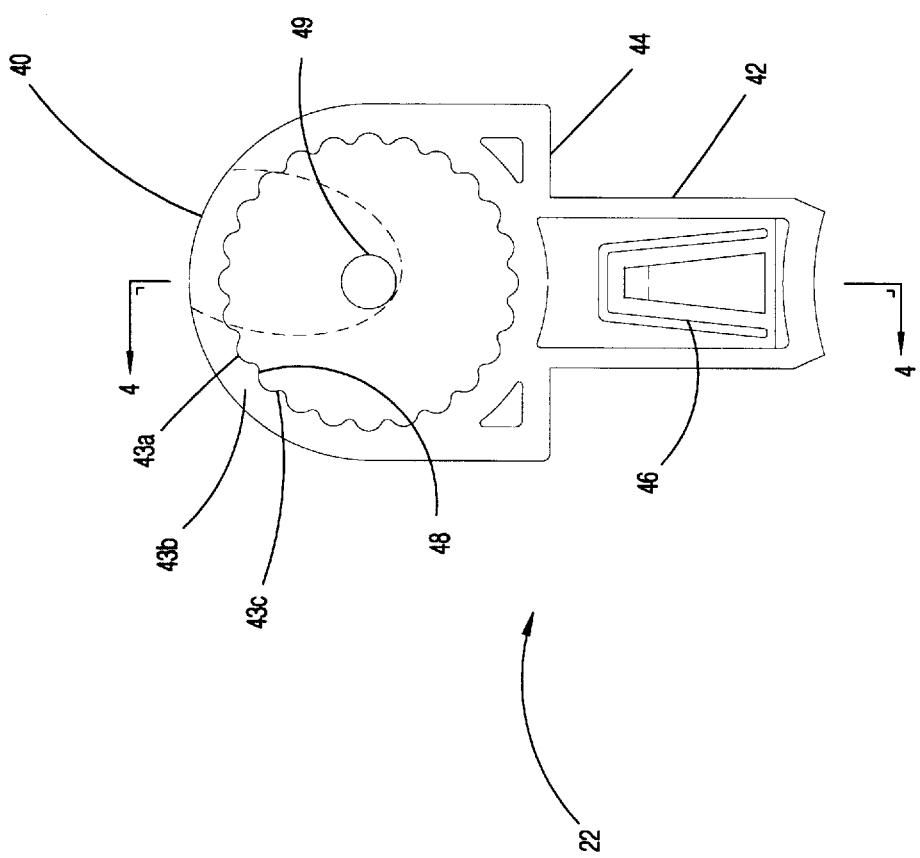

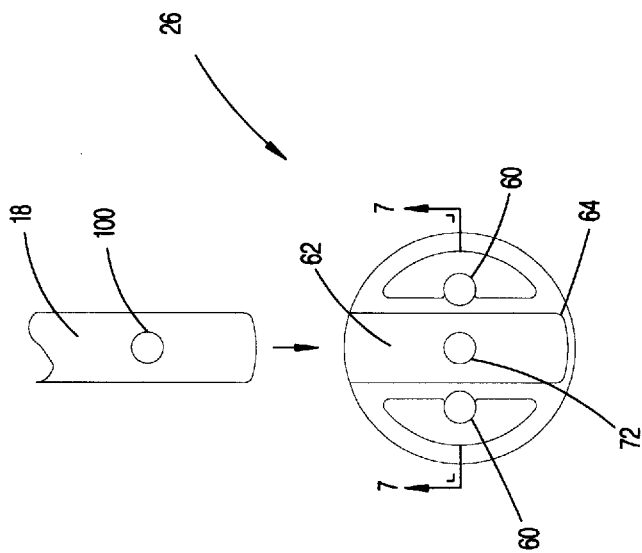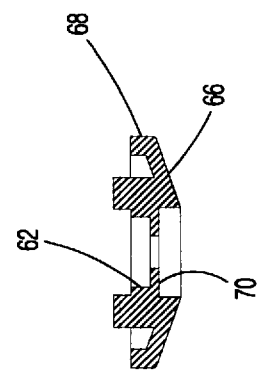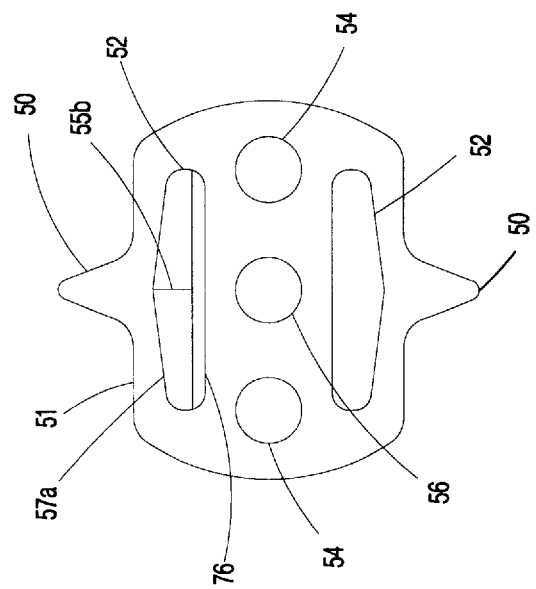

CANOPY WITH LATCH AND PIVOT MEMBERS

BACKGROUND OF THE INVENTION

1. Field of Invention

The present invention relates to a canopy which is used to protect a person or child from direct sunlight, rain, snow, or the like, and more particularly to a canopy with an improved pivot member and an improved latch member.

2. Description of Related Art

Conventional canopies suffer from several disadvantages. In the past, conventional canopies were permanently affixed to the device on which they were used. Other conventional canopies allow removal, but their removal was often difficult, time consuming, required the use of tools, and/or sometimes required the assistance of another person.

Conventional canopies are also noisy. Often, such canopies would be used on a baby stroller or a baby bassinet. When the caregiver opened or closed the canopy, the canopy pivot mechanism would often create a loud noise and awaken a sleeping child. Additionally, conventional canopies are overly large, complex, and generally unreliable and prone to breakdown.

SUMMARY OF THE INVENTION

Accordingly, the present invention is directed to an improved canopy assembly that substantially eliminates one or more of the problems or disadvantages found in the prior art.

It is an object of the invention to reduce noise and vibration associated with the operation of the canopy.

It is another object of this invention to provide for easy attachment and removal of the canopy.

It is another object of the invention to provide a design which is easily and economically manufactured.

It is another object of the invention to increase reliability of the entire canopy mechanism and reduce overall wear.

Additional features and advantages of the invention will be set forth in the following detailed description or may be learned by practicing the invention.

To achieve these and other advantages and in accordance with the purpose of the invention, as embodied and broadly described, the invention includes, on one aspect, a pivot member for use in a canopy, comprising a fixed member including a bearing surface, a resilient portion disposed adjacent to the fixed member and including a protrusion adapted to contact the bearing surface, and a rotating member connected to the resilient portion and adapted to connect to a portion of the canopy, whereby the rotating member rotates with respect to the fixed member.

Another aspect of the invention includes: a canopy adapted to be mounted to a frame, comprising a flexible canopy material, a bow for supporting the flexible canopy material, a pivot member adapted to be fixedly connected to the frame and pivotably connected to the bow, the pivot member including, a fixed member including a bearing surface, a resilient portion disposed adjacent to the fixed member and including a protrusion adapted to contact the bearing surface, and a rotating member connected to the resilient portion and connected to the bow, whereby the rotating member rotates with respect to the fixed member to move the bow.

It is to be understood that both the general description above, and the following detailed description are exemplary and explanatory and are intended to provide further explanation of the invention as claimed.

BRIEF DESCRIPTION OF THE DRAWINGS

The accompanying drawings which are included to provide a further understanding of the invention and constitute a part of this specification, illustrate an embodiment of the invention and together with the written description, serve to explain the principles of the invention. In the drawings:

FIG. 2 is an exploded view of the preferred pivot member;

FIG. 3 is-d plan view of the latch member;

FIG. 4 is a cross-sectional view of the latch member shown in FIG. 3;

FIG. 5 is a plan view of a resilient member;

FIG. 6 is a top view of a pivot member and an associated bow arm;

FIG. 7 is a cross-sectional view of the pivot member shown in FIG. 6;

DESCRIPTION OF THE PREFERRED EMBODIMENTS

Figure 1:
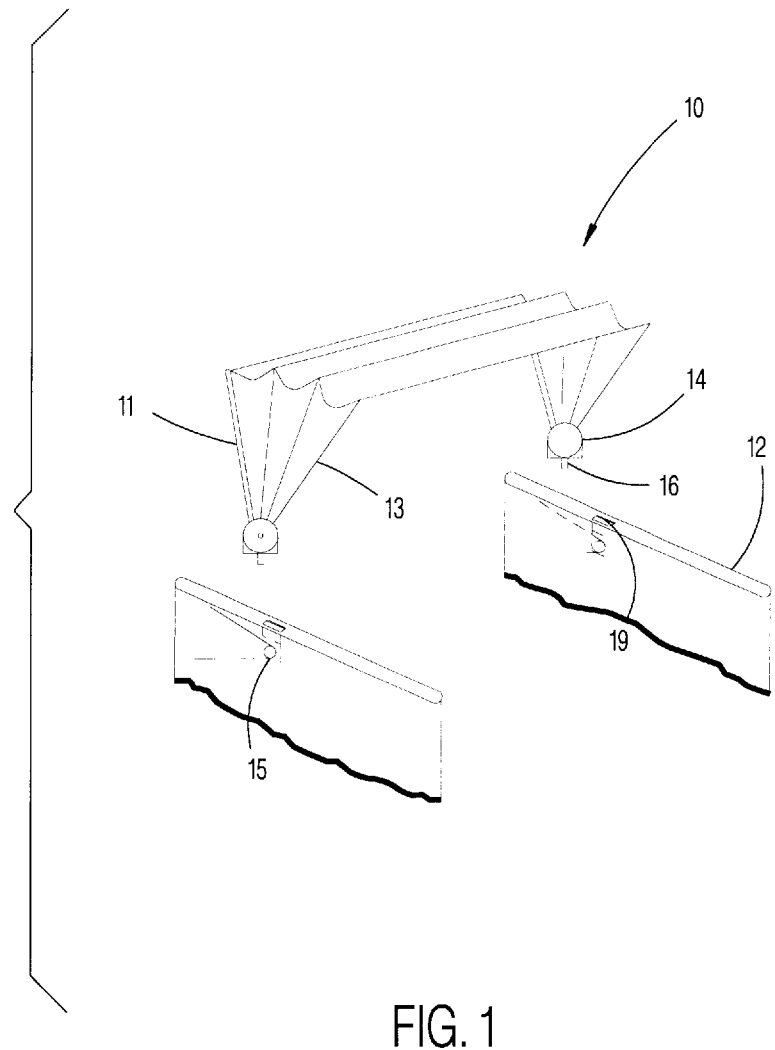
FIG. 1, is a view of the canopy and a frame.

The invention generally provides a canopy to be extended and retracted in a manner which reduces noise. An additional feature relates to the quick and simple removal and attachment of the canopy from the frame. The preferred embodiment, shown in FIG. 1, generally includes a preferred canopy 10 of the present invention, and a frame 12 on which it is mounted. It should be understood that the canopy can be used with a child stroller, a bassinet, a baby buggy, a child play yard, a swing set, or any other device which is used to support or carry a person.

The invention contemplates the use of a pivot member. The preferred emodiment of this pivot member is shown in FIGS. 1 and 2. In FIG. 1, the pivot member 14 includes a latch member 16 used to mount the canopy 10 onto the frame 12, and also holds two bows 11 and 13 of the canopy 10. The pivot member 14 is preferably located on opposite sides of the canopy, each being a mirror image of the other, and allows both of the bows 11 and 13 to pivot. In the preferred canopy, the bow 11 is easily removable, as explained in more detail infra, while the other bow 13 remains fixed to the pivot member.

FIG. 2 shows an exploded view of one of pivot members 14. A rotating member, such as a releasing support 20, is connected to a portion of the canopy, i e., the bow arm 17. The preferred releasing support 20 is connected to a resilient member 25. A fixed member, such as a latch housing 22, preferably includes a suitable connector 42 which is used to mount the pivot assembly 14 on a frame 12 (see FIG. 1). The preferred latch housing 22, in addition to having a connector 42 portion, also includes a circular region 40 which houses two resilient members 24 and 25.

The two resilient members 24 and 25 are associated with the circular region of the latch housing in a way which allows the resilient members 24 and 25 to rotate within the circular region 40a and 40b of the latch housing 22. A pivot coupling 26 is associated with one of the resilient members 24 on a bottom side. The resilient member 24 is mounted on the pivot coupling 26, and both of these elements 26, 24 rotate together in relation to the latch housing 22. In the same way, but on the opposite side of the latch housing 22, resilient member 25 is mounted on the releasing support 20 and both of these elements 20, 25 rotate together in relation to the latch housing.

A second pivoting bow arm 18 of the canopy is mounted in pivot coupling 26. Thus, it can be seen from the exploded drawing, FIG. 2, that both of the bow arms 17 and 18 can pivot in angular relation to the fixed latch member 22.

To facilitate assembly of the device, all of the elements shown in FIG. 2, except the removable arm 17, have a central aperture 82 (on releasing support 20), 56 (on resilient members 24 and 25), 49 (on latch housing 22), 70 (on pivot coupling 26) and 100 (on fixed arm 17). All of these apertures align to allow a preferred rivet 28 to pass through these elements. Preferred rivet 28 axially connects all of these elements together while allowing relative rotational motion between some of the parts.

The preferred present invention contemplates the use of a fixed member which includes a quick release fastener. The preferred embodiment of this item is shown in FIG. 3. This Figure shows the preferred embodiment of the fixed member: a latch housing 22, which includes a connector portion 42 and a circular portion 40. As shown in FIG. 1, the connector portion 42 secures the canopy 10 to a frame 12 via pivot member 14. In the preferred embodiment, a bayonet lock 46 cooperates with a suitably designed aperture 19 on the frame to provide a secure, quick release fastener for the canopy. As shown in the cross-sectional view of FIG. 3 (FIG. 4), the bayonet lock 46 includes a deformable ramp member 46a and an abutting shoulder member 46b. Shoulder 44 is disposed on either side of the connector portion 42 and, working in conjunction with the bayonet lock and the frame 12 stabilizes the connector portion and the canopy shoulder 44 and also stops the insertion of the connector portion 42.

To release the canopy 10 from the frame 12, a button 15, located on the frame and corresponding to each aperture 19, is used to depress the bayonet lock 46. Button 15 presses the abutting shoulder member 46b until it is no longer engaged to the frame. In this position, with the abutting shoulder member 46b flush with the rest of the connector portion 42, the bayonet lock 46 is free to slide out of the aperture 19.

The circular portion 40 of the latch housing 22 includes a bearing surface. In the preferred embodiment as shown in FIG. 3, two inner gear races 48a and 48b, one on either side of the latch housing 22 serves as a bearing surface. For convenience, gear race 48a will be referred to as an upper gear race, while 48b will be referred to as a lower gear race. In the preferred embodiment the two resilient members 24 and 25 (see FIG. 2) rotate within these gear races. Thus, upper gear race 48a cooperates with an upper resilient member 25 and lower gear race 48b cooperates with a lower resilient member 24.

Each gear race 48a and 48b includes at least one indentation. In the preferred embodiment, the gear races 48a and 48b include a plurality of identical, circumferentially spaced grooves. The latch housing 22 also includes a central aperture 49 to receive the fastener 28 (see FIG. 2) which is used to hold the entire pivot member 14 together.

The invention also contemplates that the pivot member include a resilient portion. The preferred embodiment of this resilient portion is a resilient member 24 shown in FIG. 5. It should be understood that resilient members 24 and 25 are preferably identical, and therefore, only resilient member 24 is discussed. The resilient member has the general appearance of a circular disk with two truncated opposite ends, or flat surfaces 51. Extending from these flat surfaces 51 are two protrusions 50 (one extending from each flat surface 51) which are adapted to cooperate with grooves 43 on the latch housing 22. As the resilient member 24 rotates within the inner gear race 48b, the protrusions 50 travel from indentation 43a (see FIG. 3) to hump 43b (see FIG. 3) to indentation 43c (see FIG. 3) and so forth around the inner periphery of the gear race 48.

As the resilient member rotates within gear race 48, the resilient member deforms to allow protrusion 50 to travel over the humps 43b on the gear race. It should be appreciated that the present invention, in its broader aspects, considers many ways to allow the resilient member to deform. For example, the protrusions 50 themselves could simply bend and deflect or the disk of the resilient member could be modified to accommodate the motion of the protrusions over the humps on the gear race. The preferred embodiment, however, includes a relief aperture 52 designed in a way which allows improved quieter indexing of the protrusions from one indentation to the next. The shape and location of the relief apertures facilitates this generally quieter yet intermittent motion.

The preferred relief apertures are located radially inward of each of the protrusions 50. The shape of the relief apertures also assists in providing this generally quieter and intermittent motion. The relief apertures are oblong with a generally rectangular shape with generous rounds. Preferably the relief apertures have two dissimilar dimensions, a longer dimension 55a and a shorter dimension 55b. The longer dimension 55a extends in a generally circumferential direction roughly parallel with the flat surface 51. The shorter dimension 55b, extends generally radially from the center of the resilient member and perpendicularly with respect to the longer dimension 55a.

In the most preferred embodiment, the relief aperture 52 includes a flat bottom 57b (the radially inner longer dimension side) and a chevron shaped top 57a (the radially outer longer dimension side which faces the protrusion). The apex of the chevron 57a is also radially aligned with the protrusion.

The resilient member 24 could be designed in other equivalent ways. For example, instead of apertures or punch-outs in the resilient member, the resilient member could be designed with regions, corresponding to the apertures, which are comprised of a material different (e.g., which is less rigid) than the surrounding material. Also, the regions corresponding to the apertures could simply be regions of reduced cross-sectional area. In other words, the resilient member would be solid in regions adjacent to the protrusions (regions which correspond to the apertures 52 shown in FIG. 5), but the resilient member would be thinner in those regions.

To facilitate mounting of the resilient member, two mounting holes 54 are provided to mate with respective engagement pins. For the lower resilient member 24, which cooperates with the pivot coupling 26, engagement pins 60 are found on the pivot coupling 26 (see FIG. 6). For the upper resilient member 25, engagement pins 88 are found on the releasing support 20 (see FIG. 2).

The inventive pivot member includes the use of a rotating member which rotates with respect to the fixed member. These rotating members also support portions of the canopy. The preferred embodiment of these rotating members includes a pivot coupling 26, shown in FIGS. 6 and 7, and a releasing support 20, shown in FIG. 2.

In FIGS. 6 and 7, the pivot coupling 26 comprises the bottom of pivot member 14. The pivot coupling 26 is used to mate with the lower resilient member 24 and to hold a fixed bow arm 18. The pivot coupling 26 is a generally disk-shaped device with an outer rim 68 and a conical outer surface 66. The top surface of the pivot coupling 26 has two engagement pins 60 which mate with the lower resilient member 24, as discussed above. The top surface also includes a slot 62 which is used to hold the fixed bow arm 18. The slot including a back wall 64 which is used to provide additional support to the bow arm and to properly align the bow arm during assembly. The bottom surface of the pivot coupling includes a counter sink aperture 70 which contains the head of the rivet or fastener. The counter sink aperture 70, in conjunction with the conical outer surface, allows the bottom surface of the pivot coupling 26 to remain smooth despite the fact that a connector is attached on that surface.

The releasing support 20, shown in FIG. 2, is similar to pivot coupling 26. Both items cooperate with resilient members 24 or 25, and both items hold one of the bow arms 17 or 18. The difference is that this member—releasing support 20—includes a easily releasable connector 98 for the removable bow arm 17.

As discussed above, the releasing support 20 has two engagement pins 88 which mate with the upper resilient member 25. The releasing support 20 allows for quiet and intermittent rotation of the removable bow arm 17 with respect to the stationary latch housing 22. A recess 92 helps to properly locate the upper resilient element 25 between the releasing support 20 and the latch housing 22 (see FIG. 3). The recess 92 cooperates with the upper gear race 48a of latch housing 22 to securely capture the upper resilient member 25 between the releasing support 20 and the latch housing 22.

To simplify manufacturing and assure part compatibility, the release support 20 is symmetric with respect to a horizontal plane which allows use of the portion either side of the canopy 10. Because of this symmetry, two additional dummy pins 90, are disposed opposite pins 88, and an additional dummy recess 94, is disposed opposite recess 92. The dummy pins 90 and dummy recess 94 merely exist as a consequence of the preferred manufacturing technique employed.

The releasing support 20 has a sleeve 80 which holds the removable bow arm 17. The bow arm 17 is received in a slot 86 formed through sleeve 80. In the preferred embodiment, the bow arm 17 is secured to the sleeve 80 by a threaded fastener 98. This fastener could be a machine screw, lag bolt, hex screw, thumb screw or any other fastener. As shown in FIG. 2, the fastener 98 extends through one side of the sleeve 80, finally extends through an aperture 102 on bow arm 17, then extends through the other side of sleeve 80 where it engages a nut 99. Preferably, the nut 99 can be self-locking and both the head of the screw and the nut can be counter sunk into sleeve 80.

Slot 86 also has a back wall 87 which supports the bow arm 17 and properly aligns the aperture 102 on the bow arm 17 with the aperture 96 on the sleeve. The back wall 87 functions in a manner that is similar to the back wall 64 found on the pivot coupling 26 (see FIG. 6).

It will be apparent to those skilled in the art that various modifications and variations can be made in the canopy latch and pivot assembly of the present invention without departing from the spirit or scope of the invention. Thus, it is intended that the present invention cover the modifications and variations of this invention provided they come within the scope of the appended claims and their equivalents.

I claim:

1. A pivot member for use in a canopy, comprising:
a fixed member having a bearing surface;
a resilient member disposed adjacent to the fixed member and including a protrusion contacting the bearing surface, said protrusion being deformable in a radially inward direction; and
a rotating member separate from and coupled to the resilient member and connected to a portion of the canopy, whereby the rotating member rotates with respect to the fixed member.

2. The pivot member as recited in claim 1, wherein the bearing surface includes an indentation for receiving the protrusion.

3. The pivot member as recited in claim 1, wherein the fixed member further comprises a shoulder portion disposed adjacent to the connection portion to stabilize the pivot member.

4. The pivot member as recited in claim 1, wherein the resilient member includes a disk shaped member.

5. The pivot member as recited in claim 4, wherein the disc shaped member includes a region of reduced rigidity.

6. The pivot member as recited in claim 5, wherein the region of reduced rigidity includes an aperture.

7. The pivot member as recited in claim 1, wherein the rotating member includes an extension to receive the portion of the canopy.

8. The pivot member as recited in claim 1, wherein the rotating member includes an internal slot for receiving the portion of the canopy.

9. The pivot member as recited in claim 1, wherein the rotating member includes a slot for receiving the portion of the canopy.

10. A pivot member for use in a canopy, comprising:
a fixed member having a bearing surface;
a resilient member disposed adjacent to the fixed member and including a protrusion contacting the bearing surface, said protrusion being deformable in a radially inward direction;
a rotating member coupled to the resilient member and connected to a portion of the canopy, whereby the rotating member rotates with respect to the fixed member; and
wherein the rotating member includes an engagement pin to interconnect the rotating member to the resilient member.

11. A pivot member for use in a canopy, comprising:
a fixed member having a bearing surface;
a resilient member disposed adjacent to the fixed member and including a protrusion contacting the bearing surface;
a rotating member connected to the resilient member and connected to a portion of the canopy, whereby the rotating member rotates with respect to the fixed member;
a second resilient member disposed adjacent to the fixed member and including a protrusion contacting a second bearing surface of the fixed member; and a second rotating member connected to the second resilient member and connected to a second portion of the canopy.

12. The pivot member as recited in claim 11, further comprising a fastener to interconnect each of the fixed member, the resilient portion, the rotating member, the second resilient portion, and the second rotating member.

13. A canopy adapted to be mounted to a frame, comprising:
a flexible canopy material;

a bow for supporting the flexible canopy material;

a pivot member fixedly connected to the frame and pivotably connected to the bow, the pivot member including:

a fixed member having a bearing surface;

a resilient member disposed adjacent to the fixed member and including a protrusion contacting the bearing surface, said protrusion being deformable in a radially inward direction, the protrusion and the bearing surface having complementary shapes, the shape of the protrusion defining a continuous, smooth surface; and a rotating member connected to the resilient member and connected to a portion of the canopy, whereby the rotating member rotates with respect to the fixed member.

14. The canopy as recited in claim 13, wherein the bearing surface includes an indentation for receiving the protrusion.

15. The canopy as recited in claim 13, wherein the fixed member further comprises a shoulder portion disposed adjacent to the connection portion to stabilize the canopy.

16. The canopy as recited in claim 13, wherein the resilient portion includes a disc shaped member.

17. The canopy as recited in claim 16, wherein the disc shaped member includes a region of reduced rigidity.

18. The canopy as recited in claim 13, wherein the rotating member includes an extension to receive the bow.

19. The canopy as recited in claim 13, wherein the rotating member includes an internal slot for receiving the bow.

20. The canopy as recited in claim 13, further comprising a second bow for supporting the flexible canopy material.

21. The canopy as recited in claim 13, wherein the rotating member includes a slot for receiving the portion of the canopy.

22. A pivot member for use in interconnecting a frame to a canopy, comprising:

a fixed member having a bearing surface, a shoulder portion disposed adjacent said bearing surface and a connection portion extending from said shoulder portion, the connection portion having a locking portion that engages an aperture in the frame to connect the fixed member to the frame, the locking portion being manually adjustable from a first locking position to a second unlocking position;

a resilient member disposed adjacent to the fixed member and including a protrusion contacting the bearing surface, said protrusion being deformable in a radially inward direction; and a rotating member connected to the resilient portion and connected to a portion of the canopy, whereby the rotating member rotates with respect to the fixed member.

23. The pivot member as recited in claim 22, wherein the shoulder portion is disposed adjacent to the connection portion to stabilize the pivot member.

24. The pivot member as recited in claim 22, wherein the bearing surface includes an indentation for receiving the protrusion.

25. The pivot member as recited in claim 22, wherein the resilient portion includes a region of reduced rigidity.

26. The pivot member as recited in claim 22, wherein the rotating member includes a slot for receiving the portion of the canopy.

* * * * *